(12) United States Patent
Guthery

(10) Patent No.: US 8,321,481 B2
(45) Date of Patent: Nov. 27, 2012

(54) METHOD FOR INCREMENTAL ANTI-TEAR GARBAGE COLLECTION

(75) Inventor: Scott B. Guthery, Chestnut Hill, MA (US)

(73) Assignee: Assa Abloy AB (SE)

( * ) Notice: Subject to any disclaimer, the term of this patent is extended or adjusted under 35 U.S.C. 154(b) by 48 days.

(21) Appl. No.: 13/107,412

(22) Filed: May 13, 2011

(65) Prior Publication Data

US 2011/0289125 A1    Nov. 24, 2011

Related U.S. Application Data

(60) Provisional application No. 61/334,485, filed on May 13, 2010.

(51) Int. Cl.
*G06F 17/30* (2006.01)
(52) U.S. Cl. .......................... 707/818; 707/692; 707/802
(58) Field of Classification Search .................. 707/802, 707/818, 692
See application file for complete search history.

(56) References Cited

U.S. PATENT DOCUMENTS

| | | | |
|---|---|---|---|
| 4,827,115 A | 5/1989 | Uchida et al. | |
| 4,877,945 A | 10/1989 | Fujisaki | |
| 5,390,148 A | 2/1995 | Saito | |
| 5,428,761 A * | 6/1995 | Herlihy et al. | 711/130 |
| 5,479,637 A | 12/1995 | Lisimaque | |
| 5,532,463 A | 7/1996 | Debelleix et al. | |
| 5,715,431 A | 2/1998 | Everett et al. | |
| 5,819,292 A | 10/1998 | Hitz et al. | |
| 5,963,962 A | 10/1999 | Hitz et al. | |
| 6,216,204 B1 | 4/2001 | Thiriet | |
| 6,289,510 B1 | 9/2001 | Nakajima | |
| 6,324,661 B1 | 11/2001 | Gerbault et al. | |
| 6,434,238 B1 | 8/2002 | Chaum et al. | |
| 6,480,935 B1 | 11/2002 | Carper | |
| 6,484,937 B1 | 11/2002 | Devaux et al. | |
| 6,535,869 B1 * | 3/2003 | Housel, III | 707/691 |
| 6,539,453 B1 | 3/2003 | Guterman | |
| 7,539,905 B2 * | 5/2009 | Kay | 714/42 |
| 2001/0007108 A1 | 7/2001 | Teich et al. | |
| 2002/0184434 A1 | 12/2002 | Kawaura | |
| 2002/0188886 A1 | 12/2002 | Liu et al. | |
| 2003/0066894 A1 | 4/2003 | Boyer et al. | |

FOREIGN PATENT DOCUMENTS

| | | |
|---|---|---|
| EP | 0920685 | 7/1997 |
| EP | 1017028 | 7/2000 |
| EP | 1046996 | 10/2000 |
| EP | 0645046 | 6/2002 |
| WO | WO 01/99449 | 12/2001 |
| WO | WO 02/09046 | 1/2002 |

(Continued)

OTHER PUBLICATIONS

Michael Stumm and Songnian Zhou, "Algorithms Implementing Distributed Shared Memory", University of Toronto, IEEE, 1990, pp. 54-64.*

(Continued)

*Primary Examiner* — Cheryl Lewis
(74) *Attorney, Agent, or Firm* — Sheridan Ross P.C.

(57) ABSTRACT

Persistent memory in an integrated circuit cars (ICC) must be managed in such a way that removal of power from the device at any moment does not leave the data stored in this memory in a faulty or inconsistent state. The mechanisms of this disclosure accomplish this end using the tag-length-value data structures found extensively in ICC software and standards.

16 Claims, 9 Drawing Sheets

FOREIGN PATENT DOCUMENTS

| | | |
|---|---|---|
| WO | WO 02/25976 | 3/2002 |
| WO | WO 02/33866 | 4/2002 |
| WO | WO 02/50844 | 6/2002 |
| WO | WO 02/054195 | 7/2002 |
| WO | WO 02/058361 | 7/2002 |
| WO | WO 03/032172 | 4/2003 |
| WO | WO 2004/068153 | 8/2004 |

OTHER PUBLICATIONS

"The Java Card™ 3 Platform," Sun Microsystems, White Paper, Aug. 2008, 34 pages, found at java.sun.com/javacard/3.0/javacard3_whitepaper.pdf.

Search Report for European Patent Application No. EP11165955, dated Sep. 27, 2011.

\* cited by examiner

| A | L | V | B | L | V | C | L | V | D | L | V | Unused Memory |

FIG. 4A

| A | L | V | B | L | V | X | L | V | D | L | V | Unused Memory |

FIG. 4B

| A | L | V | B | L | V | D | L | V | X | L | V | Unused Memory |

FIG. 4C

| A | L | V | B | L | V | D | L | V | Unused Memory |

FIG. 4D

| | | | | | | | |
|---|---|---|---|---|---|---|---|
| T1 | 2 | a | b | T2 | 2 | j | k |

Step 1

| | | | | | | | |
|---|---|---|---|---|---|---|---|
| X | 2 | a | b | T2 | 2 | j | k |

Step 2

| | | | | | | | |
|---|---|---|---|---|---|---|---|
| X | 2 | j | b | T2 | 2 | j | k |

Step 3

| | | | | | | | |
|---|---|---|---|---|---|---|---|
| X | 2 | j | k | T2 | 2 | j | k |

Step 4

| | | | | | | | |
|---|---|---|---|---|---|---|---|
| T2 | 2 | j | k | T2 | 2 | j | k |

Step 5

| | | | | | | | |
|---|---|---|---|---|---|---|---|
| T2 | 2 | j | k | X | 2 | j | k |

*FIG. 5*

Step 1

| T1 | 4 | a | b | c | d | T2 | 2 | j | k |

Step 2

| X | 4 | a | b | c | d | T2 | 2 | j | k |

Step 3

| X | 4 | j | b | c | d | T2 | 2 | j | k |

Step 4

| X | 4 | j | k | c | d | T2 | 2 | j | k |

Step 5

| X | 4 | j | k | c | 0 | T2 | 2 | j | k |

Step 6

| X | 4 | j | k | 0 | 0 | T2 | 2 | j | k |

Step 7

| X | 2 | j | k | 0 | 0 | T2 | 2 | j | k |

Step 8

| T2 | 2 | j | k | 0 | 0 | T2 | 2 | j | k |

Step 9

| T2 | 2 | j | k | 0 | 0 | X | 2 | j | k |

Step 10

| T2 | 2 | j | k | X | 0 | X | 2 | j | k |

| T2 | 2 | j | k | X | 4 | X | 2 | j | k |

*FIG. 6*

| A | B | X | C | Unused Space | |
|---|---|---|---|---|---|

| A | B | X | C | B | Unused |
|---|---|---|---|---|---|

| A | X' | X | C | B | Unused |
|---|---|---|---|---|---|

| A | X | C | B | Unused |
|---|---|---|---|---|

| A | C | X | B | Unused |
|---|---|---|---|---|

| A | C | B | X | Unused |
|---|---|---|---|---|

| A | C | B | Unused Space |
|---|---|---|---|

*FIG. 7*

Step 1

| T1 | 3 | a | b | c | T2-A | T2-B | 2 | j | k |

Step 2

| X | 3 | a | b | c | T2-A | T2-B | 2 | j | k |

Step 3

| X | 3 | 2 | b | c | T2-A | T2-B | 2 | j | k |

Step 4

| Y | 3 | 2 | b | c | T2-A | T2-B | 2 | j | k |

Step 5

| Y | 3 | 2 | j | c | T2-A | T2-B | 2 | j | k |

Step 6

| Y | 3 | 2 | j | k | T2-A | T2-B | 2 | j | k |

Step 7

| Y | T2-B | 2 | j | k | T2-A | T2-B | 2 | j | k |

Step 8

| T2-A | T2-B | 2 | j | k | T2-A | T2-B | 2 | j | k |

| T2-A | T2-B | 2 | j | k | Y | T2-B | 2 | j | k |

*FIG. 8*

| T1-A | T1-B | 2 | a | b | T2 | 3 | i | j | k |

Step 1

| Y | T1-B | 2 | a | b | T2 | 3 | i | j | k |

Step 2

| Y | 3 | 2 | a | b | T2 | 3 | i | j | k |

Step 3

| X | 3 | 2 | a | b | T2 | 3 | i | j | k |

Step 4

| X | 3 | i | a | b | T2 | 3 | i | j | k |

Step 5

| X | 3 | i | j | b | T2 | 3 | i | j | k |

Step 6

| X | 3 | i | j | k | T2 | 3 | i | j | k |

Step 7

| T2 | 3 | i | j | k | T2 | 3 | i | j | k |

Step 8

| T2 | 3 | i | j | k | X | 3 | i | j | k |

*FIG. 9*

METHOD FOR INCREMENTAL ANTI-TEAR GARBAGE COLLECTION

CROSS REFERENCE TO RELATED APPLICATIONS

This application claims the benefit of U.S. Provisional Application No. 61/334,485, filed May 13, 2010, the entire disclosure of which is hereby incorporated herein by reference.

FIELD OF THE DISCLOSURE

The present disclosure is generally directed toward memory management in electronic devices.

BACKGROUND

An ICC (Integrated Circuit Card or "smart card") contains a limited amount of persistent memory as compared to desktop or laptop computers. Therefore, when data is deleted from an ICC it is important that the memory space previously used to store deleted data is reused when new data is added to the card. Furthermore, the limited processing power of an ICC together with the requirement to process data optimum use of persistent memory suggests that individual data items be stored in contiguous memory locations.

If the number of bytes in a new data item is less than or equal to the number of contiguous bytes of a deleted data item, then the new data can be written into the contiguous memory locations previously occupied by the deleted data. The situation may arise, however, that the number of bytes in a new data item is greater than the number of contiguous bytes of storage previously occupied by any previously deleted data item but is less than the number of bytes previously occupied by all deleted data items.

In the situation that the deleted items when taken together were not contiguous in memory but were in fact isolated one from another throughout the memory, it is necessary to rearrange the data currently in memory so that the unused memory consists of contiguous memory locations. In this manner the new data item can now be written to memory. There are in the current art memory management algorithms for desktop and laptop computers called garbage collection algorithms that perform the task of reorganizing the data in memory so that space available and unused space is contiguous.

Modern ICCs include more sophisticated operating software than the simple ICCs of the past. This more sophisticated operating software includes the ability of the ICC to interact directly with the cardholder (e.g. GSM/3GGP SIM Toolkit), to load and run applications using an on-card virtual machine (e.g. Java Card, MULTOS) and to engage in network communication (e.g. GPRS and IP/TCP). These more sophisticated software techniques make more intense use of the persistent memory in the ICC, adding new data and deleting old data.

Therefore, it is of use to provide advanced garbage collection methods for ICCs.

SUMMARY

The garbage collection methods for desktop and laptop computers in the current art are not appropriate for use in ICCs. An ICC is a computer with the property unlike desktop and laptop computers that power may be removed at any moment due to the card being removed from the card reader by the cardholder. When the card is removed before a transaction between the card and the terminal is complete this is called "tearing" because the cardholder is thought of as tearing the card from the reader and as tearing up the transaction in progress. The situation is analogous to walking out of a store in the middle of a paying for a purchase.

When power is removed from an ICC, the processor in the card stops performing and any data stored in transient random access memory (RAM) is lost. It is of critical importance in this situation that the data stored in persistent memory (e.g. EEPROM, FRAM, FLASH) not be left in an erroneous or inconsistent state. This is because when the card is next used it is highly unlikely that it will be used in the same terminal and therefore the new terminal cannot be expected to correct errors or resolve inconsistencies in the stored data. Furthermore, it is possible that the data is in such an erroneous or inconsistent state that the next terminal is not able to successfully use the card at all. In this case, a particular application or utility of the card has effectively been destroyed.

In the current art there are algorithms in ICC software called anti-tearing algorithms that either prevent the data in the persistent memory from ever entering an erroneous or inconsistent state or are able to detect and repair erroneous or inconsistent states should they ever come to exist.

Currently available anti-tearing algorithms were designed for card applications in which the data stored on the ICC was rarely deleted and thus the possibility of entering an inconsistent state was rare. Thus these algorithms were designed for the situation wherein it was not necessary to perform garbage collection as part of normal operation but only in exceptional cases.

As discussed above, however, the profile of use of memory by the new software techniques found in modern ICCs generates a much larger number of deleted data items than before and therefore garbage collection is necessary more frequently than before.

As a result there is a need for a garbage collection algorithm for ICC memory management that exhibits and efficiently implements the anti-tearing property and can be employed as an integral part of the normal operating procedures of the ICC.

The correctness of the method of the disclosure is based on the following property of the computing circuitry used in ICCs: writing a single byte to a persistent memory location is an atomic operation. This means that no matter when power is removed from the IC, the pattern of bits in a single byte of memory being written to will either be the pattern of bits stored in the memory location before the write operation began or will be the pattern of bits intended to be written to the memory location by the write operation. The method of this disclosure is also based on the organization of persistent memory using a data structure commonly used in ICCs: the tag-length-value (TLV) data structure.

The method of this disclosure alters the memory storing TLV-structured data items one byte at a time in such a way that every memory configuration between the start configuration and the end configuration faithfully represents the data items stored in the memory and as a consequence no configuration between the start configuration and the end configuration is inconsistent.

Because of the atomicity of byte writes mentioned above this means that no matter when power is removed from the IC, the state of the memory faithfully reflects the data being stored in it. As a result, anti-tear protection is provided to garbage collection in a way that does not necessitate resource-intensive memory checking and repair anti-tearing algorithms used in the current art.

The garbage collection method of the disclosures applies a series of actions to the TLV-structured data in memory. Each action is either a forward action or a backward action. A forward action results in the movement of a deleted data structure closer to an unused block of memory. A backward action makes a copy of an undeleted data item and deletes the original version.

Both the forward action and the backward action are composed of a series of individual byte operations. Each byte operation is either a copy byte operation or a set byte operation. The copy byte operation sets one memory location to the bit pattern in another memory location. The set byte operation sets the bit pattern in a memory location to a particular bit pattern. By virtue of the atomic byte write property of the IC both the copy byte and the set byte operations are atomic and thus are safe over tearing.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures:

FIG. 4A is a block diagram depicting a first step in a first memory management method in accordance with embodiments of the present disclosure;

FIG. 4B is a block diagram depicting a second step in a first memory management method in accordance with embodiments of the present disclosure;

FIG. 4C is a block diagram depicting a third step in a first memory management method in accordance with embodiments of the present disclosure;

FIG. 4D is a block diagram depicting a fourth step in a first memory management method in accordance with embodiments of the present disclosure;

FIG. 5 is a series of block diagrams depicting a second memory management method in accordance with embodiments of the present disclosure;

FIG. 6 is a series of block diagram depicting a third memory management method in accordance with embodiments of the present disclosure;

FIG. 7 is a series of block diagrams depicting a fourth memory management method in accordance with embodiments of the present disclosure;

FIG. 8 is a series of block diagrams depicting a fifth memory management method in accordance with embodiments of the present disclosure; and FIG. 9 is a series of block diagrams depicting a sixth memory management method in accordance with embodiments of the present disclosure.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

The following examples illustrate the operation and all the features of the incremental anti-tearing garbage-collection method of the disclosure. Although the methods described herein are especially useful for memory management in ICCs and similar portable computing devices having memory and a processor, those of ordinary skill in the art will appreciate that embodiments of the present disclosure are not so limited. For example, embodiments of the present disclosure may be implemented in Subscriber Identity Module (SIM) cards, Near Field Communication (NFC)-enabled chips, secure elements, Secure Digital (SD) cards, virtual machines such as those run on Java® Cards (running as a mechanism inside the virtual machine memory management layer), any processor on a mobile phone, or any other computing device comprising an IC and memory.

For the purposes of the examples described herein, single-byte tags and lengths will be assumed. Multi-byte tags and lengths are discussed later.

Figure 1:
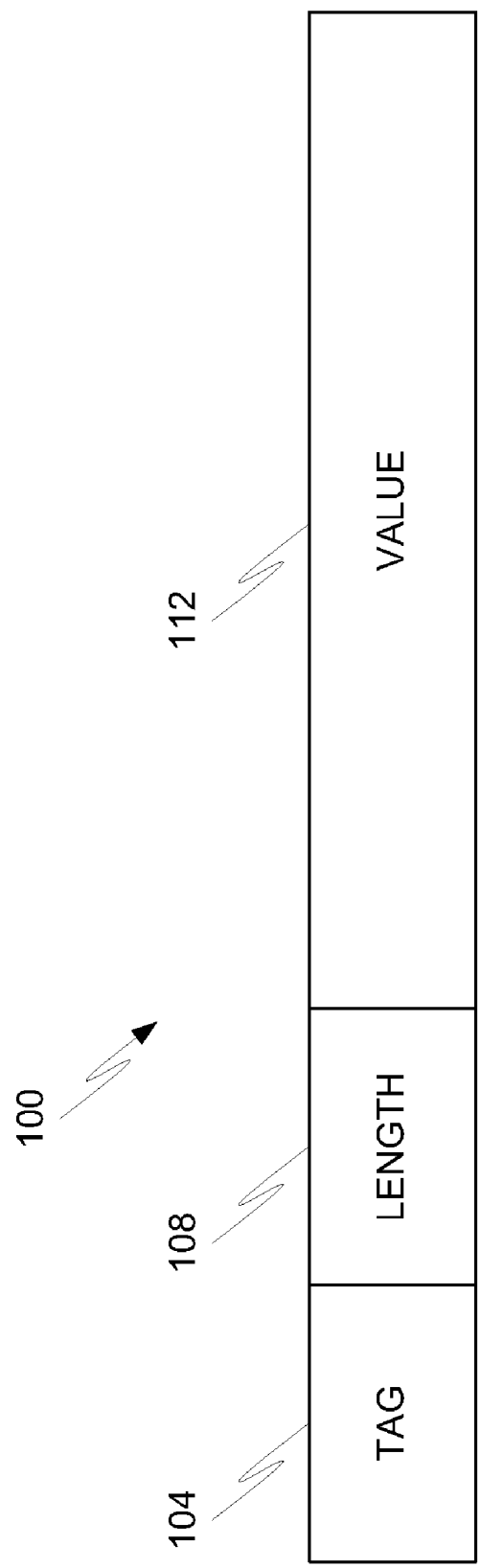
FIG. 1 is a block diagram depicting a first memory configuration in accordance with embodiments of the present disclosure.

According to ICC standards such as the ISO/IEC 7816 series of standards, the entire contents of which are hereby incorporated herein by reference, individual items of data in an IC are encoded in data structures called Tag-Length-Value data structures called simply TLV data structures. An example of such a data structure 100 is depicted in FIG. 1. A TLV data structure 100 comprises three sequential and contiguous fields of data: the tag field 104, the length field 108, and the value field 112. The tag field 104 encodes what kind of data the data item 100 contains. The length field 108 encodes the number of bytes of data in the value field 112 and the value field 112 is the data of the data item 100.

Figure 2:
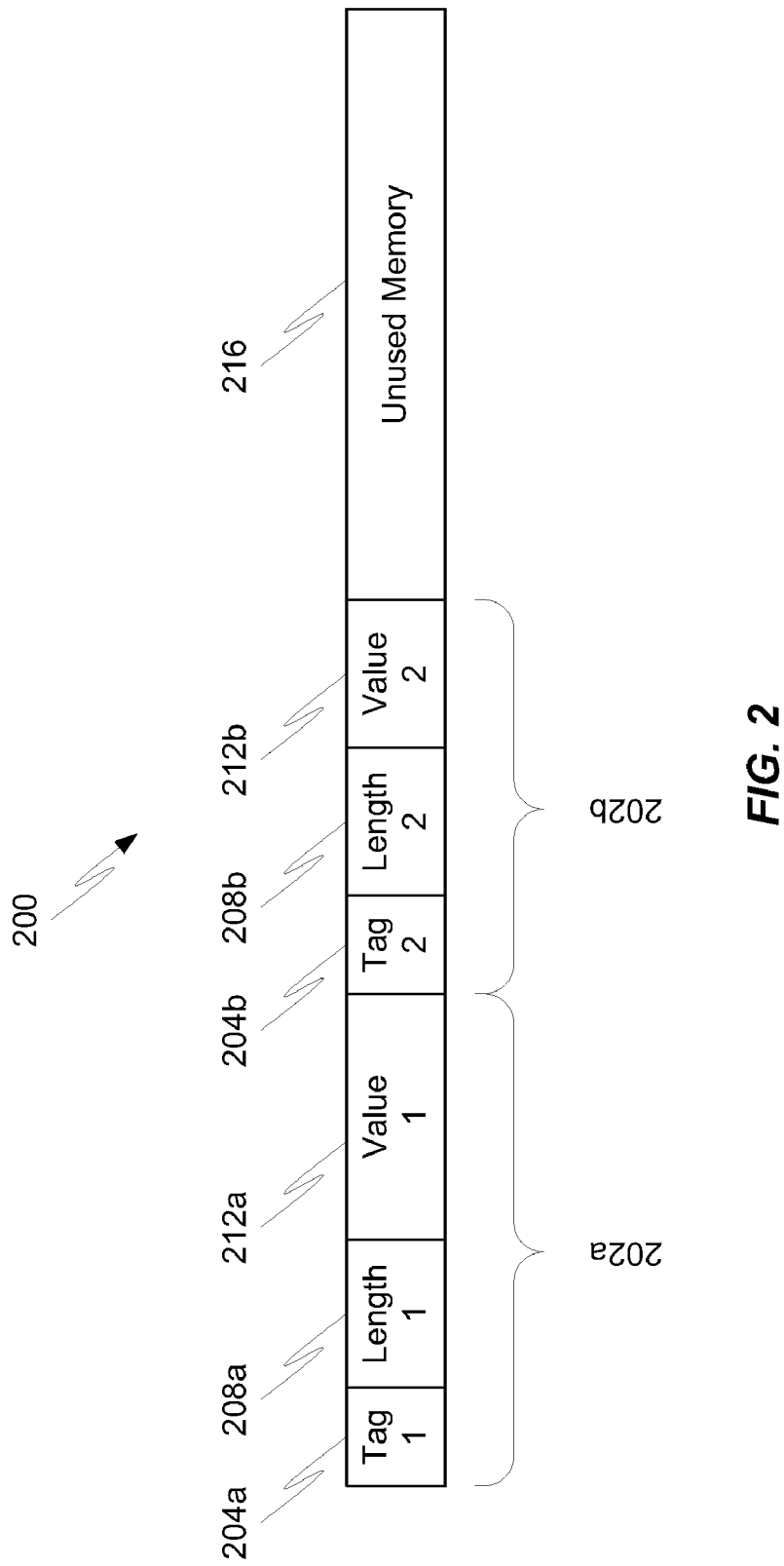
FIG. 2 is a block diagram depicting a second memory configuration in accordance with embodiments of the present disclosure.

The memory of the ICC is organized as a sequence of TLV data structures of which there are two general types: active TLV data structures that contain data currently in use and inactive TLV data structures that contain no data or deleted data that is no longer in use. In the example depicted in FIG. 2, the memory in use being on the left side of a memory diagram and the memory that is not in use being on the right side of a memory diagram. The data structure 200 depicted in FIG. 2 comprises two data items 202a, 202b, each of which may be used to store different values. In particular, each data item 202a, 202b, may have separate value fields 212a, 212b. Each value field 212a, 212b may have a corresponding tag field 204a, 204b, respectively, and a corresponding length field 208a, 208b, respectively. These data items 202a, 202b are provided on a designated side of the data structure 200 (e.g., the left side in this example) and unused memory 216 is provided on the opposite side of the data structure 200 (e.g., the right side in this example).

As can be appreciated, although the unused memory 216 is depicted as being on the right side of the data structure 200, it may be possible to position the unused memory 216 on the left side of the data structure 200 and condition the memory management methods described herein accordingly. It should also be appreciated that the data structure 200 may comprise one, two, three, four, five, or more data items, where each data item comprises a tag field, length field, and value field.

Figure 3:
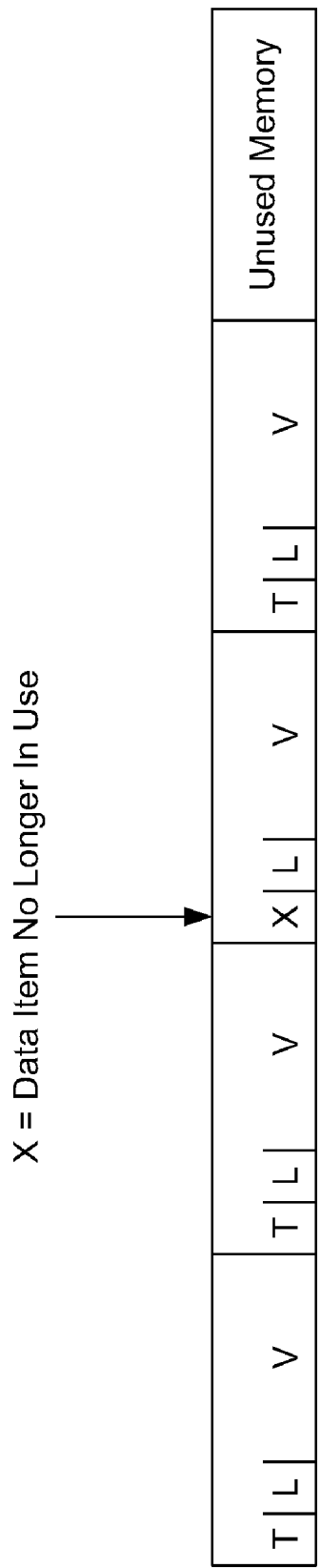
FIG. 3 is block diagram depicting a third memory configuration in accordance with embodiments of the present disclosure.

As can be seen in FIG. 3, data items may be taken out of use by setting the tag of the data item to a special tag that has the semantics "THIS DATA ITEM IS NO LONGER IN USE". Any software on the ICC—either system software or application software—that encounters such a data item ignores it.

The goal of the garbage collection of TLV-structured data of this disclosure is to move the data items between the deleted data item and the unused memory block to the left by the number of bytes in the deleted data item thereby effectively adding the number of bytes occupied by the deleted data item to the unused memory block and making them available for reuse. This process is generally depicted in FIGS. 4A-D.

FIG. 4A depicts the data structure when data items A-D are being used. However, as can be seen in FIG. 4B, data item C may be marked as "NO LONGER IN USE" at which point the data fields previously belonging to data item C are moved to the opposite side of data item D (FIG. 4C) nearest the unused memory portion, at which point the data fields from the now unused data item C may be deleted and added to the unused memory portion.

By the method of this disclosure, the garbage collection of TLV-structured data items is accomplished in such a way that memory is never in an inconsistent state and thus the garbage collection algorithm has the anti-tearing property.

In some embodiments, if the length of the deleted data item is equal to or greater than the length of the following data item, then a forward action is applied. The forward action has the effect of interchanging the deleted data item and the following data item, thus, moving the deleted data item toward the unused memory block on the right and packing the following data item with the other data items in use on the left. The forward action accomplishes this by copying the following data item over the deleted data item and then marking as deleted the original copy of the following data item.

FIG. 5 depicts a first example where a forward action is carried out and the size of the following data item is equal to the size of the deleted data item.

In the example of FIG. 5, the length of the following data item (e.g., the data item between the deleted data item and the unused memory portion) is exactly equal to the length of the deleted data item. The following steps may be followed to carry out the memory management method depicted in FIG. 5.

Step 1: The data item being deleted, e.g., the one with tag T1, is marked as no longer in use by changing its tag to the special no-longer-in-use tag, represented as X.

Step 2: The shifting to the left of the following data item, e.g., the one with tag T2, begins with the copying of the first byte in the value field of the T2 data item to the first byte in the data field of the deleted data item.

Step 3: The shifting to the left of the data item with tag T2 continues with the copying of the second byte in the value field of this data item to the second byte in the data field of the deleted data item.

Step 4: The tag of the T2 data item is copied to the tag field of the deleted data item. At this point there are two identical copies of the T2 data item in memory.

Step 5: The tag of the original copy of the T2 data item is set to X indicating that this data item is no longer in use.

As can be seen in the example of FIG. 5, the data structure stored in memory always faithfully reflects the stored data and is never in an inconsistent state after each step for the following reasons:

Step 1: The data item being deleted is marked no longer in use. If this data item is encountered it will be ignored which is what is intended. The length of the ignored data item will be used to find the next data item in the memory. The use of the length value 2 leads directly to the next data item, the data item with tag T2.

Step 2: A byte of data is copied into the value field of a data item that is being ignored. Since the data item is not in use, the value field will not be accessed by code processing the data items stored in the memory. Thus the value field of a deleted data item can contain any values whatsoever without affecting the faithful representation of the data items that are in use.

Step 3: Another byte of data is copied into the value field of a data item that is being ignored. Since the data item is being ignored, the value field can contain any values.

Step 4: The tag of the data item that is being ignored is set to the tag of the data item being shifted to the left. As a result this data item will no longer be ignored but will be taken to be the data item with tag T2. When the next data item is accessed it also has tag T2. Either of these can be taken to be the faithful representation of the T2 data item since they are identical.

Step 5: The tag of the original copy of the T2 data item is set to X causing this data item to be ignored henceforth. Now there is only one instance of the data item with tag T2.

The effect of the application of the method of the disclosure is to move the deleted data item to the right by 4 bytes. If it is now adjacent to the unused memory block, then it can be coalesced into this block and reused. If it is not adjacent to the unused memory block then the method of the disclosure can be applied again to move it to the right some more.

Another memory management example is depicted in FIG. 6. This particular memory management method employs a forward action where the size of following data item is less than or equal to the size of the deleted data item. The particular example depicted in FIG. 6 can be carried out according to the following steps.

Step 1: The data item to be deleted, e.g., the one with tag T1, is marked as no longer in use by changing its tag to the special no-longer-in-use tag, represented as X.

Step 2: The shifting to the left of the following data item, e.g., the one with tag T2, begins with the copying of the first byte in the value field of this data item to the first byte in the data field of the deleted data item.

Step 3: The shifting to the left of the data item with tag T2 continues with the copying of the second byte in the value field of this data item to the second byte in the data field of the deleted data item.

Step 4: The fourth data byte in the value field of the deleted data item is set to zero.

Step 5: The third data byte in the value field of the deleted data item is set to zero.

Step 6: The length field of the deleted data item is set to the length field of the T2 data item.

Step 7: The tag of the T2 data item is copied to the tag field of the deleted data item.

Step 8: The tag of the original copy of the T2 data item is set to X.

Step 9: The third data byte in what was the value field of the deleted data item is set to the value of the tag indicating a deleted data item, namely X.

Step 10: The fourth data byte in what was the value field of the deleted data item is set to the length of the deleted data item.

As can be seen in the example above, the data structure stored in memory always faithfully reflects the stored data and is never in an inconsistent state after each step for the following reasons:

Step 1: The data item being deleted is marked no longer in use. If this data item is encountered it will be ignored which is what is intended. The length of the ignored data item will be used to find the next data item in the memory. The use of the length value 2 leads directly to the next data item, the data item with tag T2.

Step 2: A byte of data is copied into the value field of a data item that is being ignored. Since the data item is not in use, the value field will not be accessed by code processing the data items stored in the memory. Thus the value field of a deleted data item can contain any values whatsoever without affecting the faithful representation of the data items that are in use.

Step 3: Another byte of data is copied into the value field of a data item that is being ignored. Since the data item is being ignored, the value field can contain any values.

Step 4: A byte in the value field of a data item that is being ignored is set to zero. Since the data item is being ignored, the value field can contain any values.

Step 5: A byte in the value field of a data item that is being ignored is set to zero. Since the data item is being ignored, the value field can contain any values.

Step 6: The length of the data item that is being ignored is set to the length of the data item being shifted to the left. A search for the tag of the data item following this data item will use the length value 2 and find the tag value 0. As this is an illegal tag value, the search will search to the right for a non-zero value and stop at the second copy of T2.

Step 7: The tag of the data item that is being ignored is set to the length of the data item being shifted to the left. As a result this data item will no longer be ignored but will be taken to be the data item with tag T2. When the next data item is accessed it also has tag T2. Either of these can be taken to be the faithful representation of the T2 data item since they are identical.

Step 8: The tag of the original copy of the T2 data item is set to X causing this data item to be ignored henceforth. There is now only one instance of the data item with tag T2.

Step 9: By setting the third value in what was the value field of the deleted data item to X, the search for the next data item from the new copy of the T2 data item using the length value 2 will encounter the X tag which is a valid tag so this is a valid data item. The length of this data item is 0 so the search will proceed to the next byte which is the second X and hence a valid, albeit deleted data item.

Step 10: By setting the fourth value in what was the value field of the original deleted data item to 4, the search for the next data item from the new copy of the T2 data item will skip the now-deleted original copy of the T2 data item.

The effect of the application of the method of the disclosure is to move the deleted data item to the right by 5 bytes. If it is now adjacent to the unused memory block, then it can be coalesced into this block and reused. If it is not adjacent to the unused memory block then the methods of the disclosure can be applied again to move it to the right some more.

Now a backward action will be described in accordance with embodiments of the present disclosure. In accordance with at least some embodiments, the forward action is applied whenever the length of the data item following the deleted data item is less than or equal to the length of the deleted data item. When there are no more opportunities to apply the forward action but there are still deleted data items in memory, then the backward action can be applied.

The backward action makes a copy of an in-use data item that is to the left of a deleted data item (e.g., located further away from the unused portion of memory than the deleted data item) and then deletes the original version to create a new deleted data item adjacent to an old deleted data item. These two deleted data items are coalesced into one longer deleted data item. The attempt is then made to apply the forward action using this deleted data item and the following in-use data item. FIG. 7 illustrates the sequence of the backward action in accordance with at least some embodiments of the present disclosure.

FIGS. 8 and 9 illustrate the application of the forward action in the case of a two-byte tag. For this purpose a distinguished one-byte value Y is used which when it appears as the first byte of a two-byte tag indicates a two-byte tag that is no-longer-in-use.

FIG. 8 illustrates the situation wherein the deleted data item has a two-byte tag and FIG. 9 illustrates the situation wherein the data item being moved forward over the deleted data item has a two-byte tag.

Focusing attention on FIG. 8, wherein the deleted data item has a two-byte tag and the data item being moved forward has a one-byte tag, the steps are as follows:

Step 1: The data item to be deleted, e.g., the one with the two-byte tag T1-A/T1-B, is marked as no longer in use by changing the first byte of its tag to the special two-byte no-longer-in-use tag, represented as Y.

Step 2: The second byte of the two byte tag of the data item now marked as no-longer-in-use is set to the integer value 3.

Step 3: The first byte of the no-longer-in-use data item is set to the value indicating a data item with a single-byte tag that is no-longer-in-use, X.

Steps 4-8: The situation is now exactly the same as described above for the forward action applied to data items with single-byte tags.

Considering now FIG. 9, wherein the deleted data item has a one-byte tag and the data item being moved forward has a two-byte tag, the steps are as follows:

Step 1: The data item to be deleted, e.g., the one with the single-byte tag T1, is marked as no longer in use by changing its tag to the special one-byte no-longer-in-use tag, represented as X.

Step 2: The first byte of the value field of the data item no longer in use is set to the integer value 2.

Step 3: The first byte of the no-longer-in-use data item is set to the value indicating a data item with a two-byte tag that is no-longer-in-use, Y. The value 2 inserted in Step 2 is the length field of this no-longer-in-use data item.

Step 4: The forward movement of the data item with tag T2 begins with the copying of the first byte in the value field of the T2 data item to the first byte in the value field of the not-in-use data item with the two-byte tag starting with Y.

Step 5: The forward movement of the data item with tag T2 ends with the copying of the second byte in the value field of the T2 data item to the second byte in the value field of the not-in-use data item with the two-byte tag starting with Y.

Step 6: The second byte of the data item with the two-byte tag, T2, is copied to the second byte of the two-byte tag of the data item that is marked as not-in-use.

Step 7: The first byte of the data item with the two-byte tag, T2, is copied to the first byte of the two-byte tag of the data item that is marked as not-in-use. This data item is no longer not-in-use but is now the T2 data item.

Step 8: The first byte of two-byte tag of the original copy of the T2 data item is set to Y to indicate that this original copy is now a data item with a two-byte tag that is no-longer-in-use.

As can be appreciated by those of ordinary skill in the art, it may be possible to build an alternative anti-tearing garbage collection algorithm for ICCs that uses a new and purpose-built data structure other than Tag-Length-Value to organize memory. The examples described herein were related to Tag-Length-Value organization schemes because the Tag-Length-Value data structure is already extensively used in ICCs and similar computing devices. Embodiments of the present disclosure may be particularly useful for providing multi-credential ICCs.

In the foregoing description, for the purposes of illustration, methods were described in a particular order. It should be appreciated that in alternate embodiments, the methods may be performed in a different order than that described and may be reversed according to the organization of the data structure being managed. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of organizing a data structure stored in a computer-readable memory, the data structure comprising a plurality of data blocks, wherein the data structure comprises a first data item which is to be deleted or is no longer needed, and wherein the first data item occupies a first set of data blocks, the method comprising:
   marking a data block assigned to a tag field of the first data item with an indicator to identify the first data item as no longer in use, wherein the first set of data blocks further comprise a data block assigned to a length field and at least one data block assigned to at least one value field for the first data item;
   identifying a second data item occupying a second set of data blocks adjacent to the first set of data blocks within the data structure, wherein the second data item comprises a tag field, a length field, and at least one value field, each of which are assigned to at least one data block in the second set of data blocks;
   copying a value from a data block assigned to a first value field of the second data item to a data block assigned to a first value field of the first data item such that a value previously stored in the data block assigned to the first value field of the first data item is replaced with the value from the data block assigned to the first value field of the second data item;
   repeating the copying step until all values from data blocks assigned to all value fields of the second data item have been copied to data blocks assigned to value fields of the first data item;
   determining that values from data blocks assigned to all value fields of the second data item have been copied to data blocks assigned to value fields of the first data item;
   replacing a value in the data block assigned to the length field of the first data item with a value in the data block assigned to the length field of the second data item; and
   replacing a value in the data block assigned to the tag field of the first data item with a value in the data block assigned to the tag field of the second data item.

2. The method of claim 1, further comprising:
   after determining that values from data blocks assigned to all value fields of the second data item have been copied to data blocks assigned to value fields of the first data item and after the values in the data blocks assigned to the tag and length fields of the first data item have been replaced with the values in the data blocks assigned to the tag and length fields of the second data item, marking the data block in the second set of data blocks assigned to the tag field with an indicator to identify the second set of data blocks as no longer in use.

3. The method of claim 2, wherein the copying and replacing steps are performed as atomic operations.

4. The method of claim 2, wherein after the second data item has been copied to the first set of data blocks, the second data blocks are coalesced into an unused memory block.

5. The method of claim 3, wherein during each step the state of the memory accurately reflects the data being stored in it.

6. The method of claim 5, wherein the replacing steps are performed after the determining step.

7. The method of claim 1, wherein the first data item comprises more data blocks assigned to value fields than the second data item, the method further comprising:
   inserting a zero into at least one data block in the first set of data blocks which is assigned to a value field of the first data item.

8. The method of claim 1, wherein at least two bytes are assigned to the tag field of the first data item and wherein a first byte in the at least two bytes comprises the indicator.

9. The method of claim 1, wherein the memory is maintained in an Integrated Circuit Card.

10. The method of claim 1, wherein each data block in the first and second sets of data blocks comprise a length of one byte.

11. The method of claim 1, wherein the second set of data blocks is positioned between the first set of data blocks and a data block that is unused.

12. A computer-readable medium comprising processor-executable instructions that, when executed by a processor of the computational device, perform the method of claim 1.

13. A computing device, comprising:

memory which includes a data structure; and instructions configured to maintain the data structure such that the data structure always reflects the data stored in the data structure, wherein the instructions are configured to perform a plurality of atomic operations which cause data from a first set of data blocks assigned to a first data item to be replaced with data from a second set of data blocks assigned to a second data item when the first data item is identified as being deleted or no longer needed.

14. The device of claim 13, wherein the first and second sets of data blocks are adjacent.

15. The device of claim 14, wherein the second set of data blocks are positioned between the first set of data blocks and an unused data block.

16. A method of managing memory having a first set of data blocks, a second set of data blocks, a third set of data blocks, and a fourth set of data blocks, wherein the second set of data blocks are positioned between the first and third set of data blocks, and wherein the third set of data blocks are positioned between the second and fourth set of data blocks, the method comprising:

determining that a first data item stored in the first set of data blocks has been deleted or is no longer needed;

performing a plurality of atomic operations which causes a second data item stored in the second set of data blocks to be transferred to the first set of data blocks;

after the second data item has been transferred to the first set of data blocks, performing a plurality of atomic operations which causes a third data item stored in the third set of data blocks to be transferred to the second set of data blocks;

after the third data item has been transferred to the second set of data blocks, coalescing the third set of data blocks with the fourth set of data blocks.

* * * * *